Figure 1:
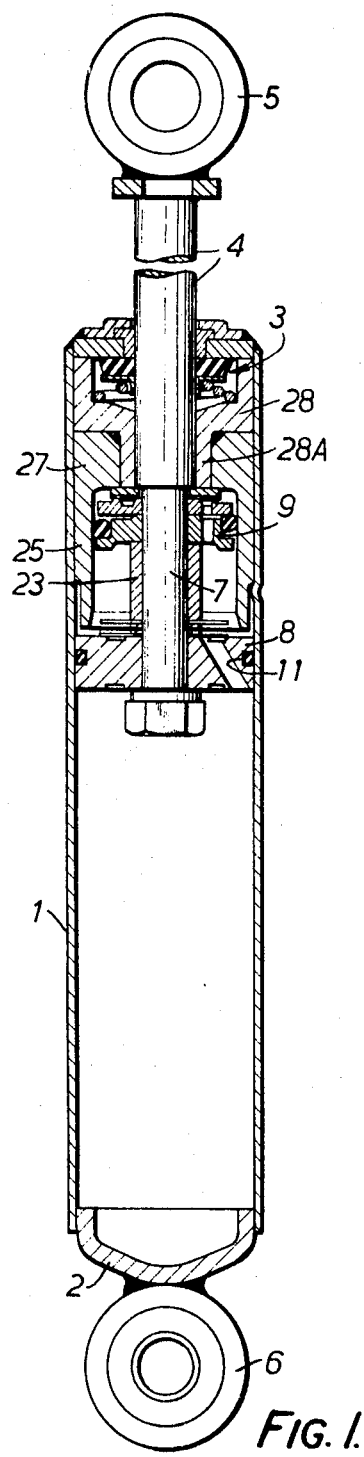

United States Patent

[11] 3,598,205

[72] Inventor Dennis Kenyon
 Mirfield, England
[21] Appl. No. 809,516
[22] Filed Mar. 24, 1969
[45] Patented Aug. 10, 1971
[73] Assignee Woodhead Manufacturing Company
 Limited
 Yorkshire, England
[32] Priority Apr. 1, 1968
[33] Great Britain
[31] 15543/68

[54] SHOCK ABSORBER INCLUDING PLURAL
 CONTROL MEANS
 1 Claim, 2 Drawing Figs.
[52] U.S. Cl....................................................... 188/284,
 188/317
[51] Int. Cl........................................................ F16f 9/48
[50] Field of Search............................................188/88.501,
 88.503, 88.504, 88.505, 88.506, 76.2, 76.52,
 76.51, 76.5, 76.6, 100 S

[56] References Cited
UNITED STATES PATENTS
| | | | |
|---|---|---|---|
| 919,036 | 4/1909 | Langer | 188/88.505 UX |
| 2,369,008 | 2/1945 | Beecher | 188/88.505 UX |
| 2,717,058 | 9/1955 | Brundrett | 188/88 (.505) |
| 2,823,915 | 2/1958 | De Carbon | 188/100 AF UX |
| 3,150,747 | 9/1964 | Bliven et al. | 188/88 |
| 3,378,110 | 4/1968 | Parrish, Jr. | 188/88 (.505) |

FOREIGN PATENTS
| | | | |
|---|---|---|---|
| 1,369,229 | 6/1964 | France | 188/88 |

Primary Examiner—George E. A. Halvosa
Attorney—Pierce, Scheffler and Parker

ABSTRACT: A shock absorber which comprises a working cylinder, a piston arranged to slide in the cylinder and main fluid control means controlling flow of fluid from one side of the piston to the other. Subsidiary fluid control means are provided which are arranged to impose a threshold resistance to movement of the piston with respect to the cylinder in at least one direction, and to reduce or eliminate the threshold resistance after an initial movement of the piston with respect to the cylinder.

PATENTED AUG 10 1971

3,598,205

INVENTOR
DENNIS KENYON

BY
Pierce, Scheffler & Parker
ATTORNEYS

SHOCK ABSORBER INCLUDING PLURAL CONTROL MEANS

BACKGROUND OF THE INVENTION

This invention relates to shock absorbers and is more particularly, but not exclusively, concerned with a shock absorber which is suitable for incorporation in a trailer coupling, which is arranged upon overrun of the towing vehicle by the trailer when the brakes are applied in the towing vehicle to cause through mechanical linkages operation of the brakes in the trailer itself. In order to prevent the retardation induced application and the acceleration or free-running induced release of the trailer brakes from being snatchy in operation it is desirable to introduce two control mechanisms within the overrun brake operating mechanism. One of these control mechanisms is arranged to provide a light threshold resistance which must be overcome before the trailer brakes become operative upon retardation of the towing vehicle, and the other control mechanism is arranged to control the rate of release of the trailer brakes upon cessation of braking of the towing vehicle.

SUMMARY OF THE INVENTION

It is an object of the present invention to provide a shock absorber which includes both these control mechanisms and will therefore be suitable for incorporation in such a trailer coupling, and according to the present invention the shock absorber is provided with main fluid control means controlling the flow of fluid from one side of its piston to the other, and subsidiary fluid control means arranged to impose a threshold resistance to movement of the piston with respect to the cylinder in at least one direction and arranged to reduce or eliminate the threshold resistance after the initial movement of the piston with respect to the cylinder. Thus the main fluid control means provide the control mechanism to control the rate of release of the trailer brakes, while the subsidiary fluid control means provide the threshold resistance for the initial movement only of the piston.

The subsidiary fluid control means may prevent, or substantially restrict, flow of fluid from one part of the shock absorber to another until the piston has travelled a predetermined distance, the restriction on the flow of fluid being arranged to impose during the travel of the piston over this predetermined distance a resistance to movement of the piston constituting the threshold resistance. The subsidiary fluid control means may be controlled by movement of the piston, or a part connected thereto so that after the piston has travelled the said distance fluid is permitted to flow freely from the said one part of the shock absorber to the said other part so that the resistance to movement of the piston is then controlled solely by the main fluid control means.

In one construction a subsidiary piston is connected to the piston (hereinafter called the main piston) and is arranged to slide within a subsidiary cylinder, the arrangement being such that as the subsidiary piston slides in one direction in the subsidiary cylinder flow of fluid into the subsidiary cylinder is prevented or substantially restricted while as the piston slides in the other direction substantially free flow of the fluid takes place out of the subsidiary cylinder.

Preferably the shock absorber is monotubular and preferably it includes a working fluid which comprises a mixture of liquid and gas in direct contact and under pressure and which in operation is in the form of an emulsion. An example of such a shock absorber is shown in the present applicants' British Patent Specification No. 1,033,810.

When the shock absorber is included in a trailer coupling the subsidiary piston will preferably be arranged so that under normal towing conditions it is within the subsidiary cylinder. Thus, when overrun takes place a resistance to movement of the main piston will be imposed upon it by reason of the application of the internal pressure of the shock absorber acting upon the whole of the subsidiary cylinder bore, since the chamber formed between the subsidiary piston and the subsidiary cylinder is substantially isolated from the remainder of the subsidiary cylinder and the damper cylinder, and this resistance will continue until the subsidiary piston leaves the subsidiary cylinder.

The subsidiary piston may include an O-ring movable axially in a circumferential groove therein and cooperating with a passage or passages and arranged so as to prevent or substantially restrict flow of fluid into the subsidiary cylinder on movement of the subsidiary piston out of the subsidiary cylinder while permitting free flow of fluid into the subsidiary cylinder on inward movement.

In either case a metering or bleed notch or notches may be provided to permit a certain degree of fluid flow to take place into the subsidiary cylinder. The bleed notch or notches provide a means of controlling the degree of threshold resistance, which can also be controlled by the diameter and/or length of the subsidiary cylinder, the pressure and the gas/liquid ration in the working fluid.

Preferably the main piston includes passages, the flow of fluid in one direction through which, is controlled by valving while the flow of fluid in the opposite direction therethrough is controlled by bleed notches, which are preferably incorporated in the valving. The arrangement is conveniently such that when the shock absorber is included in a trailer coupling the movement of the shock absorber piston in the direction in which flow of fluid takes place solely through the bleed notches will provide the control required before the brakes in the trailer are released upon cessation of braking in the towing vehicle.

According to one aspect of the present invention a trailer coupling includes a shock absorber according to the invention.

Figure 2:
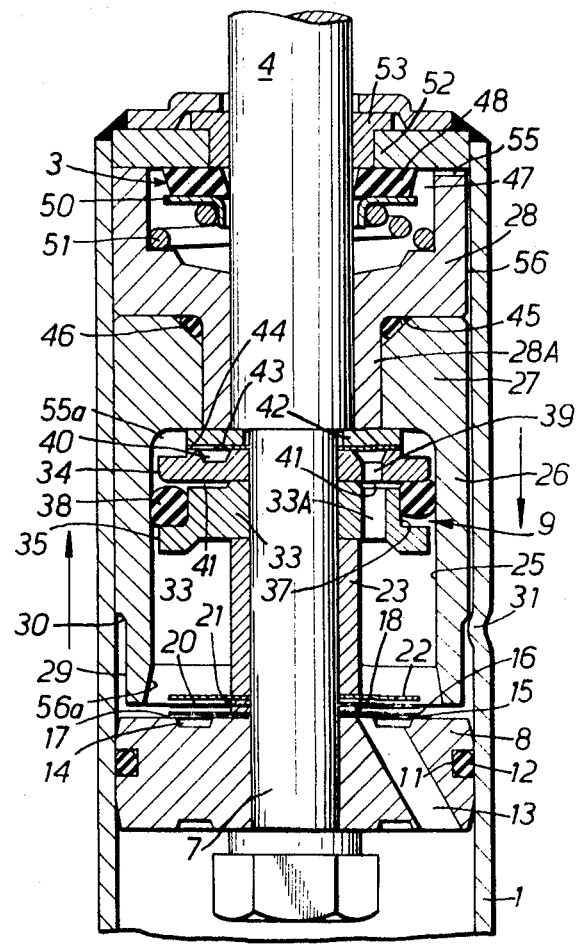

The invention may be carried into practice in various ways and one specific embodiment will now be described by way of example with reference to the accompanying drawings, in which:

FIG. 1 is a view, partly in cross section, of a shock absorber according to the present invention; and FIG. 2 is an enlarged view of the upper end of the shock absorber shown in FIG. 1.

The shock absorber shown in FIG. 1 comprises a working cylinder indicated generally at 1 closed at its lower end 2 and provided at its upper end with sealing means indicated generally at 3 through which extends a piston rod 4. Connections 5 and 6 are provided respectively at the upper end of the piston rod and at the lower end of the working cylinder for connection of the shock absorber to the parts between which vibrations are to be damped. The lower end of the piston rod has connected to it a piston pin 7 to which is secured, as more fully described hereafter, a main piston 8 and a subsidiary piston 9.

The main piston 8 is provided with a circumferential groove 11 in which is positioned an O-ring 12 which is arranged to ensure a seal between the piston 8 and the wall of the cylinder 1.

Extending through the main piston 8 are passages 13 the upper ends of which open into an annular recess 14 in the upper face of the piston.

Mounted on top of the annular recess 14 are two spring discs 15 and 16, the disc 15 having one or more bleed notches 17 in its outer periphery which are arranged to provide a controlled bleed through the passages 13. Arranged above the disc 16 is a spacer washer 18, above which is a further disc 20, then a further spacer washer 21 and a further disc 22. In operation, when the main piston 8 is descending into the cylinder the discs 15 and 16 will provide a control over the movement of the piston into the cylinder, the disc 20 serving to restrict upward movement of the discs 15 and 16 and the disc 22 providing a further restriction on the movement of the disc 20 which in turn provides a further restriction of movement on the discs 15 and 16. On movement of the main piston upwardly in the cylinder 1 the control of fluid from above the piston to below the piston is controlled solely by the size of the bleed notch 17.

The disc 22 is spaced by means of a distance piece 23 from the subsidiary piston 9 which is arranged to slide in a subsidiary cylinder 25.

The subsidiary cylinder 25 is of smaller diameter than the cylinder 1 and is formed by an annular member 26 having a radially extending flange 27 at its upper end, which abuts against a seal housing 28. The annular member 26 has a part 29 of reduced external diameter at its lower end, the shoulder 30 formed by this reduced diameter part being retained in position in the working cylinder by staking the wall of the cylinder 1 at this point as shown at 31.

The subsidiary piston is formed in two parts, a lower part 33 and an upper part 34. The lower part 33 has passages 33A extending therethrough and is provided with a generally radially extending flange 35 at its lower end and arranged to form with the upper part 34 a circumferential recess 37 in which is located an O-ring 38, the recess being axially longer than the diameter of the O-ring so that the latter can slide axially therein. The parts 33 and 34 are of lesser diameter than the subsidiary cylinder so as to allow passage of fluid past them into the subsidiary cylinder as more fully explained hereafter.

The upper part 34 of the piston is provided with passages 39 extending therethrough and communicating at their upper ends with an annular recess 40. The lower ends of the passages 39 communicate with an annular recess 41 formed between the part 34 and the part 35 and communicating with the annular recess 37. Arranged above the upper part 34 is a backup washer 42 abutting against a washer 43 which is provided with bleed notches 44, which control the flow of fluid through the passages 39.

The radially extending flange 27 of the annular member 26 abuts at its upper end with the extension of the body of the seal housing 28, and at its inner cylindrical surface with the outer surface of an axially extending flange 28A of the housing 28. The member 26 is provided with chamfered upper inner corners 45 arranged so that an O-ring 46 can provide a seal therein between the flange 27 of the member 26 and the member 28.

The seal housing 28 contains a recess 47 in its upper end, the recess containing the fluid seal 3 which comprises a sealing ring 48 surrounding the piston rod 4 and which is preferably in the form shown in the present applicants' British Patent Specification No. 1,033,810. The seal 48 is supported by a backup washer 50 which is biassed by means of a spring 51 into engagement with a flange 52 forming, in conjunction with a bearing member 53, the outer end of the working cylinder 1. A passage 55 connects the upper end of the seal chamber via a passage 56 with the upper end of the working cylinder.

The shock absorber is primarily intended for incorporation in a trailer coupling and its operation will be described with reference to the manner in which it operates when so used. In this application the shock absorber would in practice, be disposed horizontally but for the purpose of this description it will be assumed to be used vertically as shown in the drawings. During normal towing, that is to say under constant load, the piston rod and piston are arranged close to the fully closed position as shown in the FIGS. Upon overrun induced by the application of the towing vehicle brakes, the inward movement of the piston rod is resisted by the internal pressure of the shock absorber which acts upon the whole of the subsidiary cylinder bore. This occurs because the chamber formed above the subsidiary piston, indicated at 55a, is isolated by the subsidiary piston seal 38 from the remainder of the subsidiary cylinder bore. As will be seen on the right-hand side of FIG. 2, upon movement of the piston rod inwardly the O-ring 38 is urged upwardly to abut against the lower face of the upper part 34 of the subsidiary piston. In this position it seals both against the bore of the subsidiary cylinder and the inner periphery of the circumferential groove 37 and in so doing prevents flow of fluid through the annular groove formed between the part 35 of the subsidiary piston and the cylinder wall.

Upon inward travel of the piston rod there is an increase of resistance due to the compression of fluid below and expansion of fluid above the subsidiary piston until the O-ring 38 reaches the end of the subsidiary cylinder, at which point the sealing action is broken and the chamber 55a is connected with the working cylinder 1, so that fluid can then flow freely into the subsidiary cylinder to balance the pressures. This initial resistance constitutes the threshold resistance.

The end of the subsidiary cylinder is chamfered as shown at 56a to facilitate movement of the O-ring 38 into the subsidiary cylinder. Upon extension of the shock absorber after cessation of braking the seal 38 reenters the subsidiary cylinder and allows outward flow of fluid to take place into the main cylinder from the subsidiary cylinder. The position the parts occupy upon inward movement is shown in the left-hand side of FIG. 2 and it will be seen that fluid flows from the chamber 55a past the side of the upper piston part 34 and since the O-ring is biassed against the radial flange 35 it flows through the passages 33A since it is permitted to enter these through the peripheral groove 41 by the position of the 0 ring.

There is at all times a small compression force generated by the pressure acting on the piston rod area.

The bleed notch or notches 44 in the washer 43 are not essential but are preferably incorporated to provide a certain degree of communication between the chamber 55a and the other side of the subsidiary piston. The degree of threshold resistance can thus be controlled (or tuned) by the size and/or number of bleed notches such as 44. The threshold resistance can also be controlled by the diameter or length of the subsidiary cylinder bore and the pressure and gas/liquid ratio of the working fluid.

What I claim as my invention and desire to secure by Letters Patent is:

1. A shock absorber comprising a working cylinder, a pressurized gas-liquid mixture within said working cylinder, a piston rod slidably extending into said working cylinder, a main piston mounted on the inner end of said piston rod for slidable movement in said working cylinder, a subsidiary cylinder disposed within said working cylinder behind said main piston, the open end thereof facing said main piston, a subsidiary piston mounted on said piston rod and slidably movable within and out of said subsidiary cylinder means for restrictively controlling flow of said gas-liquid mixture from the front side of said main piston to the other side thereof and into said subsidiary cylinder, means for restrictively controlling flow of said gas-liquid mixture from the front side of said subsidiary piston to the other side thereof upon the inward movement of the piston rod in said working cylinder while the subsidiary piston remains in said subsidiary cylinder, said subsidiary piston being provided with a circumferential recess thereabout and passage means radially spaced from said recess, and in communication therewith, and an O-ring movably seated in said recess and cooperating with said passage means to prevent flow of said gas-liquid mixture past said subsidiary piston through said passage means during inward movement of said piston rod and to permit rapid flow of said gas-liquid mixture past said subsidiary piston through said passage means during return movement of said piston rod, said gas-liquid mixture being free to flow into said subsidiary cylinder when said subsidiary piston has moved out of said subsidiary cylinder into said working cylinder during the operation of said piston rod, whereby said subsidiary piston and said subsidiary cylinder provide an initial resistance to movement of said piston rod when it starts its inward movement into said working cylinder.